United States Patent [19]

Cohen

[11] Patent Number: 4,613,483
[45] Date of Patent: Sep. 23, 1986

[54] COATED POLYMERIZATION VESSELS AND METHODS FOR USE THEREOF

[75] Inventor: Louis Cohen, Avon Lake, Ohio

[73] Assignee: The B. F. Goodrich Company, Akron, Ohio

[21] Appl. No.: 669,166

[22] Filed: Nov. 7, 1984

[51] Int. Cl.⁴ ............................................... C08F 2/00
[52] U.S. Cl. .................................... 422/131; 422/241; 427/230; 427/236; 526/62
[58] Field of Search ..................... 526/62; 525/61, 62; 422/131, 241; 427/230, 239, 236, 237

[56] References Cited

U.S. PATENT DOCUMENTS

| | | | |
|---|---|---|---|
| 3,669,946 | 6/1972 | Koyanagi et al. | 526/62 |
| 3,705,137 | 12/1972 | Kuwahara et al. | 526/62 |
| 3,778,423 | 12/1973 | Reiter | 526/62 |
| 3,825,434 | 7/1974 | Berens et al. | 422/241 |
| 3,968,311 | 7/1976 | Hekal et al. | 427/230 X |
| 4,024,301 | 5/1977 | Witenhafer et al. | 422/241 X |
| 4,024,330 | 5/1977 | Morningstar et al. | 422/241 X |
| 4,098,972 | 7/1978 | Ogawa et al. | 526/62 |
| 4,142,033 | 2/1979 | Witenhafer | 526/62 |
| 4,228,130 | 10/1980 | Cohen | 422/241 X |
| 4,456,731 | 6/1984 | Caporossi et al. | 526/62 X |

Primary Examiner—Richard L. Chiesa
Attorney, Agent, or Firm—J. Hughes Powell; A. A. Csontos

[57] ABSTRACT

Anionic water soluble carboxyl-containing polymers, deposited and dried on polymerization reactor surfaces exposed to polymerization mixtures, substantially reduce or eliminate undesirable polymer build-up on reactor surfaces during aqueous polymerization of vinylidene monomers, even when the amount of carboxyl-containing polymers deposited on the reactor surfaces is in an amount as small as at least one ppm of monomers being polymerized, providing a layer on the polymerization surfaces as thin as about 0.1 to about one or more microns in thickness.

22 Claims, No Drawings

COATED POLYMERIZATION VESSELS AND METHODS FOR USE THEREOF

BACKGROUND OF THE INVENTION

The polymerization of unsaturated monomers commercially is normally conducted in large vessels or reactors which are frequently provided with auxiliary equipment, such as baffles, heat transfer coils, instrument wells, stirring or mixing means, and the like. Vinyl chloride, for example, when polymerized either alone or with other vinylidene comonomers, is normally polymerized in water in the presence of suspending, dispersing or emulsifying agents and free radical forming catalysts in pressure polymerization reactors. In such polymerizations, in both the suspension and emulsion systems, polymer is usually deposited on surfaces of the polymerization reactor walls, baffles, agitator and other exposed surfaces. This polymer build-up normally begins as a thin layer, often referred to as paper build-up, which, with successive charges, becomes increasingly heavy, of a sandy and often hard nature.

These undesirable polymer deposits on the surfaces of the equipment with which the reaction mixtures come into contact interfere with the efficient heat transfer. Further, these deposits have a tendency to deteriorate. The deposits often break off of the surfaces, resulting in contamination of the reaction mixture and the products produced therefrom.

The nature of the polymer build-up is such that it is very often necessary, after each polymerization reaction is completed, to open the reactor and scrape the polymer build-up off the walls, baffles and agitator, etc. An operation such as this is costly, both in labor and down-time of the reactor, i.e., lost production. In order to reduce polymer build-up, it has been proposed to coat the interior surfaces of the polymerization vessels with various materials prior to the start of the reaction. As examples of some of these coating materials, reference is made to U.S. Pat. No. 4,024,330, polyaromatic amines in organic solvents; U.S. Pat. No. 4,024,301, polyaromatic amines in aqueous alkali; U.S. Pat. No. 4,255,470, polyaromatic amines in HCl solution; U.S. Pat. No. 4,080,173, self-condensed polyhydric phenols in aqueous alkali; U.S. Pat. No. 4,228,130, polyhydric phenol-sodium hypochlorite reaction products; U.S. Pat. No. 4,105,840, aqueous solutions of tannins and tannates; U.S. Pat. No. 3,825,434, a first coating of a phenolic, epoxide, etc., coated with an insolubilized hydrophilic polymer; and U.S. Pat. No. 4,142,033, a 2 layer coating of a dye and a methocel; and the like.

While all of the these coating materials, and others, have proved to be useful in reducing, and in many cases eliminating polymer build-up, in some cases they have contributed to polymer discoloration. Further in some applications, as in materials exposed to food or in medical applications, the presence of smaller amounts of these materials is often required, so that their efficiency is reduced. The industry requires methods to prevent this build-up on polymerization surfaces exposed to the polymerization medium to eliminate this expensive cleaning step.

SUMMARY OF THE INVENTION

Anionic water soluble carboxyl-containing polymers, deposited and dried on polymerization reactor surfaces exposed to polymerization mixtures, substantially reduce or eliminate undesirable polymer build-up on reactor surfaces during aqueous polymerization of vinylidene monomers, even when the amount of carboxyl-containing polymers deposited on the reactor surfaces is very small.

DETAILED DESCRIPTION

It was quite surprising and unexpected to find that the herein defined water-soluble anionic carboxyl containing polymers were effective in reducing or eliminating polymer build-up on polymerization reactor surfaces when deposited on the reactor surfaces before a polymerization reaction, when vinylidene monomers such as vinyl chloride were polymerized in aqueous media. Usually, water soluble polymers, which are irreversibly absorbable from water and water-miscible solvents, such as polyvinyl alcohol, polyacrylic acid, gelatin, albumin, and the like, are not effective in preventing polymer build-up on reactor surfaces during polymerization reactions. In fact, materials such as polyvinyl alcohol actually contribute to and enhance polymer build-up on surfaces coated with this polymer. Contrary to this, and quite unexpectedly, it was found that when the defined water-soluble anionic carboxyl-containing polymers were applied to reactor surfaces and dried, that polymer build-up on reactor surfaces during polymerization of vinylidene monomers in water was substantially reduced or eliminated. A further advantage of these materials for this important use is that they are colorless and inherently non-toxic in the form used.

The carboxyl-containing polymers will contain from about 30 to about 80 mole percent of residues equivalent to olefinically unsaturated monocarboxylic acid monomers, and about 70 to 30 mole percent of residues equivalent to at least one other vinylidene monomer having at least one terminal >CH$_2$ group. In other words, the residue of acrylic acid, for instance, in a polymer, is

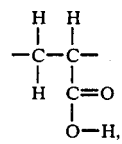

whether derived from polymerization of acrylic acid, or hydrolysis of ester groups as in polyethylacrylate, for example, amide or nitrile and like hydrolyzable groups in polymers. The residue of typical comonomers, in a copolymer thereof such as ethylene and ethyl acrylate in the polymer chain are,

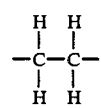

for ethylene; and

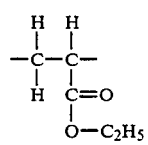

for ethylacrylate; being obtainable by copolymerizing ethyl acrylate, or by esterification of a carboxyl group, as an acrylic acid residue in polyacrylic acid. In any event, the anionic water-soluble polymer must contain residues equivalent to carboxyl-containing monomers and residue equivalent to at least one other copolymerized vinylidene comonomer in the hereinafter defined amounts, and have a minimum water solubility.

The mole percent of carboxyl groups derived from monocarboxylic acids, or the equivalent thereof, as by the hydrolysis of ester, amide and nitrile groups, must be greater than 25 mole percent carboxyl groups per mole of polymer, and more preferably is from about 35 to 65 mole percent. As to dicarboxylic acids and anhydrides, such as maleic acid, and the anhydride thereof, the mole percent of carboxyl groups in the copolymers muset be from about 50 mole percent to about 100 mole percent, the copolymers containing about 50 mole percent maleic acid and about 50 mole percent of other vinylidene comonomers. While these maleic acid anionic copolymers may contain up to about 100 mole percent of carboxyl groups, compared to only about 80 mole percent in monocarboxylic acid polymers, the difference in amounts of carboxyl allowable lies in the presence of carboxyl groups on adjacent carbon atoms in maleic acid, and this affects the activity of the acid groups. For example, the pKa of acrylic acid is 4.25, while that of maleic acid is 1.83. In this application, maleic acid copolymers containing 100 mole percent carboxyl groups (50 mole percent maleic acid) are about equivalent in effectiveness as acrylic acid copolymers containing about 50 mole percent carboxyl groups.

The carboxyl-containing polymers must have a water-solubility, of at least about 2 weight percent in water, to complete, 100%, water solubility. The polymers preferably are substantially water soluble. The polymers have weight average molecular weights from about 3,000 to about 1,000,000 or more, more preferably from about 5,000 to about 500,000.

These essential polymers may be obtained in a number of ways. They may be obtained by direct copolymerization of unsaturated carboxylic acids with vinylidene comomomers containing at least one terminal $>CH_2$ group. They may also be obtained by esterification of carboxylic acid homopolymers; or by hydrolysis of ester, amide or nitrile groups of polymers containing sufficient hydrolyzable groups to provide the required amount of carboxyl groups. Another efficient method to obtain the polymers is by esterification of maleic anhydride copolymers with alcohols and/or water to the desired carboxyl content. Another useful method is by the hydrolysis of carboxylic acid chlorides, as acrylyl chloride groups, in copolymers. Carboxyl-containing polymers can also be obtained from copolymers of butadiene-1,3, for example, containing about 30 weight percent styrene copolymerized therewith, by carboxylating the unsaturated groups of the butadiene-1,3 residues in the copolymer with maleic anhydride, mercapto-substituted carboxylic acids such as beta-mercaptopropionic acid, or alkali metal monosalts of saturated dicarboxylic acid such as monosodium succinate.

In preparing the defined copolymers, it is considered more efficient and economical to obtain the carboxyl-containing copolymers by direct copolymerization of the carboxylic monomers or anhydrides, when appropriate, with the vinylidene comonomers, than to obtain the carboxyl groups indirectly as by hydrolysis, and the like.

The carboxylic monomers used in preparing the coating materials are olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, —C=C—COOH; or as part of a terminal methylene grouping $CH_2=C<$. Olefinically-unsaturated acids of this class include such materials as the acrylic acids typified by the acrylic acid itself, methacrylic acid, ethacrylic acid, alpha-cyano acrylic acid, beta methacrylic acid (crotonic acid), alpha-chloro-acrylic acid, alpha-phenyl acrylic acid, beta-acryloxy propionic acid, sorbic acid, alpha-chloro sorbic acid, angelic acid, cinnamic acid, p-chloro cinnamic acid, beta-stearyl acrylic acid, 1-carboxy-4-phenyl butadiene-1,3, itaconic acid, citraconic acid, mesaconic acid, glutaconic acid, aconitic acid, maleic acid, fumaric acid, tricarboxy ethylene, and the like. As used herein, the term "carboxylic acid" includes the polycarboxylic acids and acid anhydrides, including maleic acid anhydride, wherein the anhydride group is formed by the elimination of one molecule of water from two carboxyl groups located on the same polycarboxylic acid molecule. Maleic anhydride and other acid anhydrides useful herein have the general structure

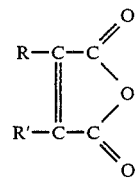

wherein R and R' are selected from the group consisting of hydrogen, halogen and cyanogen (—C≡N) groups and alkyl, aryl, alkaryo, aralkyl, and cycloalkyl groups such as methyl, ethyl, propyl, octyl, decyl, phenyl, tolyl, xylyl, benzyl, cyclohexyl, and the like.

The preferred carboxylic monomers are the mono-olefinic acrylic acid and acrylic acid anhydride, maleic acid and maleic acid anhydride. The acrylic acids have the general structure

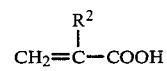

wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred.

The defined carboxylic acids are copolymerized with one or more other vinylidene monomers containing at least one terminal $>CH_2$ group. Such monomers include, for example, acrylate ester monomers including those acrylic acid ester monomers such as derivatives of an acrylic acid represented by the formula

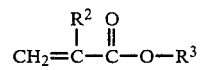

wherein $R^3$ is an alkyl group having from 1 to 30 carbon atoms, preferably 1 to 20, and more preferably 1 to 12 carbon atoms, and $R^2$ is hydrogen, methyl or ethyl, present in the copolymer in amount, for example, from about 1 to 40 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like; higher alkyl acrylic esters are decyl acrylate, isodecyl methacrylate, lauryl acrylate, stearyl acrylate, behenyl acrylate and melissyl acrylate, and the corresponding methacrylates. Mixture of two or three acrylic esters may be successfully polymerized with one of the carboxylic monomers.

Homopolymers or copolymers of these acrylate esters may be prepared and hydrolyzed as with caustic to obtain the desired carboxyl-containing polymers.

Other useful vinylidene comonomers include $\alpha,\beta$-olefinically unsaturated nitriles, preferably the monoolefinically usaturated nitriles having from 3 to 10 carbon atoms atoms siuch as acrylonitrile, methacrylonitrile, and the like. Most preferred are acrylonitrile and methacrylonitrile. Acrylic amides including monoolefinically unsaturated amides also may be used. These have at least one hydrogen on the amide nitrogen and the olefinic unsaturation is alpha-beta to the carbonyl group. Representative amides include acrylamide, methacrylamide, N-t-butyl acrylamide, N-cyclohexyl acrylamide, and others. Preferred are acrylamide and methacrylamide. Other acrylic amides include N-alkylol amids of alpha, beta-olefinically unsaturated carboxylic acids including those having from 4 to 10 carbon atoms such as N-methylol acrylamide, N-propanol acrylamide, N-methylol methacrylamide, N-methylol maleimide, N-methylol maleamic acid esters, the N-alkylol amides of the vinyl aromatic acids such as N-methylol-p-vinyl benzamide, and the like. These nitrile and amide containing polymers can be hydrolyzed to form carboxyl groups. Also useful are $\alpha$-olefins containing from 2 to 12 carbon atoms, more preferably from 2 to 8 carbon atoms; dienes containing from 4 to 10 carbon atoms; vinyl esters and allyl esters such as vinyl acetate, vinyl butyrate and the like; vinyl aromatics such as styrene, $\alpha$-methyl styrene, vinyl toluene, chlorostyrenes, nitrostyrene and the like; vinyl and allyl ethers and ketones such as methyl vinyl ketone; alkyl vinyl ethers of the formula $CH_2=CH-OR$, wherein R is an alkyl group containing 1 to 6 carbon atoms such as methyl vinyl ether, ethyl vinyl ether, propyl vinyl ether, and the like; and vinyl ethers of the formula $(-CH_2CH_2O-)_nR$ wherein n is 1 to 4 and R is an alkyl radical containing 1 to 4 carbon atoms; chloroacrylates, cyanoacrylates such as $\alpha$-cyanomethyl acrylate, the $\alpha$-, $\beta$- and $\gamma$-cyanopropyl acrylates; alkoxyacrylates such as methoxy ethyl acrylate; haloacrylates as chloroethyl acrylate; hydroxy alkyl acrylates; glycidyl acrylate and methacrylate; vinyl halides and vinyl chloride, vinylidene chloride and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis($\beta$-haloalkyl)vinyl phosphonates, and the like.

The polymerizations to form the carboxyl-containing copolymers are conducted in mass or in inert liquid media. The monomers may be batch charged or continuously added during the course of polymerization, or by any other manner of polymerization techniques conventionally used. In one preferred method, the medium has some solubilizing effect on one or more of the monomeric ingredients, but substantially none of the resulting polymer. In other words, the medium used for the polymerization is one in which the monomers are preferably soluble and the polymer is substantially insoluble. Typical solvents include hydrocarbon containing 6 to 8 carbon atoms, such as benzene, tetralin, hexane, heptane, cyclohexane, carbon tetrachloride, chloroform, trichloroethylene, methyl chloride, ethyl chloride, and methylene chloride; chlorofluoroalkanes such as chlorofluoromethane and chlorofluoroethane containing at least 4 halogen atoms; dimethyl formamides and tetrahydrofuran; esters such as methyl acetate and ethyl acetate; alcohols including methanol, ethanol, butanol; ketones such as acetone and methyl ethyl ketone; water and the like. The amount of organic medium used normally will be in excess of the monomers to be polymerized and the proportion may vary from at least 1 weight percent of monomers and 99 weight percent organic medium up to about 50 weight percent monomers and 50 weight percent medium.

Polymerization of the monomers is usually carried out in the presence of a free-radical forming or ionic catalyst in a closed vessel in an inert atmosphere under autogenous pressure or artificially-induced pressure, or in an open vessel in an inert atmosphere under reflux at atmospheric pressure, in batch or continuous systems with proper agitation. Temperature of the polymerization may be varied from about 0° C. to 125° C. or lower or higher. Polymerization at 25° C. to 90° C. using a free radical catalyst is generally effective in producing polymer yields of 75% to 100%. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, di(2-ethylhexyl)peroxydicarbonate, and the like, as well as azo catalysts such as azodiisobutyryl nitrile. Other catalysts utilized are the so-called "redox" type of catalyst and the heavy-metal activated catalyst systems. Ultra-violet light may also be used as a source of free radicals.

Typical carboxyl-containing polymers are those obtained by copolymerizing 35 to 65 weight percent of acrylic acid with 65 to 35 weight percent of ethyl acrylate, propyl acrylate or butyl acrylate; and 50 mole percent of methacrylic acid with 50 mole percent ethyl acrylate. Equivalent carboxyl-containing copolymers may be prepared by reacting sufficient trimethyl ortho acetate with polyacrylic acid to obtain polymers containing 35 to 50 weight percent carboxyl groups and 65 to 50 weight percennt ethyl ester groups.

Maleic acid copolymers are readily obtained by preparing copolymers of 50 mole percent maleic anhydrides and 50 mole percent of methyl vinyl ether, styrene, ethylene, and the like, which are then hydrolyzed with alcohols to convert one half of the carbonyl groups of the anhydride to carboxyl groups and the other half to esters. For instance, ethyl, propyl or butyl esters obtained from ethyl alcohol, propyl alcohol or butyl alcohol. Similar carboxyl containing polymers are obtained from copolymers containing 50 mole percent maleic anhydride and 50 mole percent ethylene or styrene; from styrene copolymers with fumaric acid; and the like.

Reactor surfaces are coated with the carboxyl-containing polymers from soution by brushing, spraying and the like, and dried by heating. The amount of carboxyl-containing polymers deposited on the polymerization reactor surfaces can be an amount as small as at least about one ppm of polymer of the monomers being polymerized, providing a layer as thin as about 0.1 micron, up to about one micron or more. While about one micron has been found to be satisfactory in most vinyl chloride polymerizations, larger amounts may be used in coatings up to about 5 to 10 microns, if desired. If needed, thicker coats may be applied, but are usually not necessary.

In accordance with this invention, once the reactor surfaces are coated multiple polymerization reactions may be run without opening the reactor between charges. Although multiple charges may be run without recoating the surfaces, it has been found to be useful, and preferred, to recoat the internal surfaces of the reactor after each charge, to insure uniform and efficient production. Spray nozzles are used in applying the coating solution to the inner surfaces of the reactor since with this method all inner surfaces of the reactor are more easily reached in the least amount of time. When it is decided to recoat the reactor, the reactor is drained, and the inner surfaces are flushed with water. Using the spray nozzles, these steps can be accomplished without reopening the reactor. This process can be repeated after each charge or periodically after a certain number of charges, as required, depending upon the production schedule and the down-time allotted to each reactor.

The novel reactor coatings and process of the invention are applicable to the polymerization of any vinylidene monomer in aqueous medium but is particularly useful in the polymerization of vinyl halide or vinylidene halide monomers, optionally copolymerized with other vinylidene comonomers, in pressure vessels with water in the presence of dispersing, suspending or emulsifying agents and free radical forming catalysts, usually, peroxy catalysts. The polymerizations are normally conducted in the range of about 30° to 60° C., lower temperatures as from about 0° C. to about 100° C. The polymerization may be conducted in batch or continuous operations. Also, the reactants may be partly premixed, proportioned and the like as is the practice in the art.

The vinyl or vinylidene halide monomers correspond to the structural formula

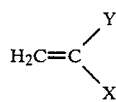

wherein X is a halogen selected from the group consisting of chlorine, bromine or fluorine and Y is hydrogen or a halogen the same as defined for X.

In addition to the vinyl chloride monomer, one or more other copolymerizable olefinically unsaturated, vinylidene comonomers, preferably containing at least one terminal vinylidene group, $>CH_2$, more preferably a terminal methylene group ($H_2C=C<$), may also be employed therewith. The amount of vinyl chloride monomer will range from about 40% or more, preferably about 50%, to 100% by weight of the total monomers polymerized. Usually less than about 50% by weight of the copolymerizable vinylidene comonomers is present in vinyl chloride copolymers. Copolymerizable comonomers include dienes of 4 to 10 carbon atoms, such as butadiene-1,3; ethylidene norborene, dicyclopentadiene and other cyclic dienes; α-olefins such as ethylene, propylene, isobutylene, butene-1 and 4-methylpentene-1, 1-octene, and the like preferably containing 1 to 4 carbon atoms; vinyl bromide, vinylidene chloride, vinyl fluoride; vinyl esters such as vinyl acetate, vinyl laurate and vinyl chloroacetate; vinyl aromatics such as styrene, chlorostyrene, α-methyl styrene, vinyl toluene and vinyl naphthalene; alkyl vinyl ethers and ketones such as methyl vinyl ether, isobutyl vinyl ether, N-butyl vinyl ether, chloroethyl vinyl ether, isobutyl vinyl ether, methyl vinyl ketone, ethyl vinyl ketone, and the like; α,β-olefinically unsaturated nitriles such as acrylonitrile, methacrylonitrile; cyanoalkyl acrylates such as α-cyanomethyl acrylate and the α-, β- and γ-cyanopropyl acrylates; esters of olefinically unsaturated carboxylic acids including α,β-olefinically unsaturated acids such as methyl acrylate, ethyl acrylate and the like wherein the alkyl groups contain 1 to 20, preferably 1 to 8, carbon atoms, chloropropyl acrylate, methyl methacrylate, ethyl methacrylate, methyl ethacrylate, 2-ethylhexyl acrylate, cyclohexyl acrylate, phenyl acrylate, glycidyl acrylate, glycidyl methacrylate, ethoxyethyl acrylate, and the like; esters of maleic and fumaric acid as methyl fumarate; polyfunctional monomers such as methylene bisacrylamide; ethylene glycol dimethacrylate, diethylene glycol diacrylate, divinyl benzene and allyl pentaerythritol; bis(β-haloalkyl)alkenyl phosphonates such as bis(β-chloroethyl)vinyl phosphonate; amide monomers derived from an α,β-olefinically unsaturated carboxylic acid and having the structural formula

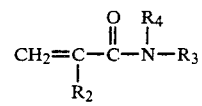

wherein $R_2$ is hydrogen or an alkyl group containing from 1 to 4 carbon atoms and $R_3$ and $R_4$ are hydrogen or a radical containing from 1 to 12 carbon atoms and more preferably an alkyl group containing from 1 to 8 carbon atoms including acrylamide and methacrylamide, N-propyl acrylamide, diacetone acrylamide and the like; α,β-γ olefinically unsaturated N-alkylol amides or α,β-olefinically unsaturated N-alkoxyalkyl amides of the formula

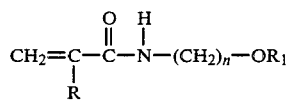

wherein R is hydrogen or an alkyl group containing from 1 to 4 carbon atoms, $R_1$ is hydrogen or an alkyl group containing from 1 to 8 carbon atoms and n is an integer from 1 to 4, including N-methylol acrylamide, N-methylol methacrylamide.

In carrying out the polymerization reaction the usual catalysts or initiators which normally form free radicals, including organic peroxides and aliphatic azo compounds are used. Such materials include, for example, α,α'-azodiisobutyronitrile and the like; organic peroxides including diacyl peroxides such as acetyl peroxide in dimethyl phthalate, benzoyl peroxide, 2,4-dichlorobenzoyl peroxide, lauroyl peroxide, pelargonyl peroxide; peroxyesters such as esterbutyl peroxyacetate, tert-butyl peroxyisobutyrate, tert-butyl peroxypivalate, tert-butyl peroxy(2-ethyl-hexanoate); alkyl peroxides such as α,α'-bis-(t-butylperoxy)diisopropylbenzene, n-butyl-4,4-bis(tert-butylperoxy)valerate, di-tert-amyl peroxide, dicumyl peroxide, 2,5-dimethyl-2,5-bis(tert-butyl hydroperoxide), 1,1,3,3-tetramethyl butyl hydroperoxide, cumene hydroperoxide, 2,5-dimethylhexane-2,5-dihydroperoxide, diisopropylbenzene hydroperoxide; ketone peroxides; methyl ethyl ketone peroxides; sulfonyl acyl peroxides such as acetyl cyclohexyl sulfonyl peroxide; acetyl sec-heptylsulfonyl peroxide; peroxy carbonates such as tert-butylperoxy isopropyl carbonate; peroxy dicarbonates such as tert-butylperoxy isopropyl carbonate; peroxy dicarbonates such as bis(4-t-butylcyclohexyl)peroxy dicarbonate, dicyclohexyl peroxydicarbonate, diisopropyl peroxydicarbonate; di(2-ethyl hexyl)peroxydicarbonate, tertiary alkyl perketals such as 2,2-bis(tert-butylperoxy)butane; mixtures thereof; bis(4-tert-butyl cyclohexyl)peroxydicarbonate, di-(2-ethyl hexyl)peroxydicarbonate, diisononanoyl peroxide, benzoyl peroxide, t-butyl hydroperoxide, t-buttyl peroxypivalate, cumene hydroperoxide, cyclohexyl hydroperoxide, tert-butyl peroxyneodecanoate, and the like; useful initiators or catalysts are the water-soluble peroxygen compounds, such as hydrogen peroxide, persulfates, such as potassium persulfate, ammonium persulfate, and the like. Also, mixtures of catalysts or initiators may be employed, either water-insoluble or water-soluble or both. For example, a 50-50 mixture of di(2-ethyl hexyl)peroxydicarbonate and diisononanoyl peroxide can be used. Whether a single initiator or a mixture of initiators is employed, the amount thereof will be in the range of about 0.01% to about one or more percent by weight, based on the weight of 100 parts of monomer or monomers being polymerized, and preferably in the range of about 0.015% to about 0.15% by weight although large amounts may be used if desired. Often used are lauroyl peroxide, di-ethyl peroxydicarbonate, di(n-propyl)peroxydicarbonate, diisopropyl peroxydicarbonate, di(sec-butyl)peroxydicarbonate and acetyl cyclohexane sulfonyl peroxide.

In suspension polymerization systems, the suspending agents usually employed include partially hydrolyzed polyvinyl acetate, polyvinyl alcohol; cellulose ether; gelatin; polyacrylic acid; alkyl cellulose wherein the alkyl groups contain 1 to 4 carbon atoms and derivatives thereof such as hydroxy, methyl, ethyl and the like, such as methyl cellulose and hydroxy ethyl cellulose. These suspending agents may be used in conjunction with secondary dispersants and small amounts of emulsifiers such as alkyl benzene sulfonate, alkyl sulfates, and the like. Other usual additives may be included as buffers, salts, modifiers and the like. The suspending agents are generally used in amounts from about 0.01 phm to 0.5 phm, more preferably from about 0.02 to 0.07 phm (parts per hundred of monomer).

For aqueous emulsion polymerization techniques, the aqueous reaction medium will contain one or more emulsifiers or an emulsifier system, such as a salt of a long chain fatty acid and a long straight chain saturated alcohol. Usually, an alkali metal or ammonium salt of a long chain saturated fatty acid is used as the emulsifier or as part of the emulsifier system. The saturated fatty acids referred to may be either natural or synthetic and should contain from 8 to 20 carbon atoms. As examples of such acids there may be named lauric, myristic, palmitic, stearic, and the like, beef tallow, coconut oil, resin acids, naphthenic acids and the like. Excellent results are obtained when the anionic emulsifiers are alkali metal or ammonium salts of the sulfates of alcohols having from 8 to 18 carbon atoms. Examples of such emulsifiers include sodium lauryl sulfate, ethanolamine lauryl sulfate, ethylamine lauryl sulfate, and the like; alkali metal and ammonium salts of sulfonated petroleum and parraffin oils; sodium salts of hydrocarbon sulfonic acids, such as dodecane-1-sulfonic acid and octadiene-1-sulfonic acid; sodium salts of alpha-olefin sulfonates; aralkyl sulfonates, such as sodium isopropyl benzene sulfonate, sodium dodecyl benzene sulfonate, sodium isobutyl naphthalene sulfonate, and the like; alkali metal and ammonium salts of sulfonate and the like; alkali metal and ammonium salts of sulfonate dicarboxylic acid esters, such as sodium dioctyl sulfosuccinate, disodium-octadecyl sulfosuccinate, and the like; alkali metal and ammonium salts of free acid of complex organic monoand di-phosphate esters, and the like; non-ionic emulsifiers such as octyl- or nonyl-phenyl polyethoxyethanol; poly(alkoxy)non-ionics, and particularly polyethers as poly(oxyethylene)sorbitol laurate, poly(oxyethylene)stearates, poly(oxyethylene) esters of mixed fatty and rosin acids, fatty alcohol ethylene oxide condensates, glycerol monostearate, sorbitan esters of fatty acids, diethylene glycol stearate and the like may be used. Cationic surface active agents include quaternary ammonium salts as cetyl dimethylbenzyl ammonium chloride, amine cationic surface active agents as the monooleate of triethanolamine, primary fatty amines as stearyl amine, tertiary aminepolyoxyethylene condensate as polyoxyethylene coco amine and quaternary amines as dicoco dimethyl ammonium chloride.

Better results are obtained with anionic or non-ionic surface active agents compared to cationic surface active agents. However, the latter may be used, particularly where low foaming characteristics are desired and in conjunction with anionic and non-ionic surface active agents. More preferred of these two are the anionic surface active agents.

Vinyl polymer latices having excellent stability are obtained when employing the alkali metal and ammonium salts of aromatic sulfonic acid, aralkyl sulfonates and long chain sulfonates. The emulsifier is employed usually in an amount in the range of about 0.1% to about 5.0% by weight, based on the weight of monomer or monomers being polymerized, and preferably, an amount of emulsifier in the range of about 0.5% to about 2.5% is used. When employing more than one emulsifier in the system, the combined weight thereof will be in the same ranges.

In addition to the compounds named above, it is very often desirable, in order to obtain certain desirable vinyl dispersion resin properties, to employ in the polymerization one or more long straight chain alcohols, containing from 8 to 24 carbon atoms, in the emulsifier system. The addition of the alcohol(s) increases the colloidal stability of the polymerization system. As examples of such alcohols there may be named octanol, nonanol, decanol, undecanol, dodecanol, tridecanol, tetradecanol, pentadecanol, heptadecanol, octadecanol, nonadecanol, eicosanol, heneicosanol, docosanol, tricosanol, tetracosanol, and the like. As an example of a mixture of alcohols there may be mentioned the use of a 12 carbon alcohol plus an 18 carbon alcohol. Further, ethoxylated alcohols can be used, such as a mixture of ethoxylated linear primary alcohols containing from 12 to 15 carbon atoms, etc. The ratio of alcohol to emulsifier can range from 0.15 to 1.0 or greater depending upon the emulsifier being used. For example, when the emulsifier is an ammonium salt of a fatty acid, the ratio of alcohol to fatty acid salt can be 1.0 but preferably the ratio is greater than 1.0.

In the aqueous polymerization of vinyl monomers, the polymerization is conducted at a pH in the range of about 2.0 to about 10.0. The amount of alkaline agent needed to properly adjust and maintain the proper pH will depend in part on the particular system being used in the reaction mixture. Other usual additives such as buffers, modifiers and the like may be used.

EXAMPLES

In the following Examples, ½ by 2½ inch ferrotype panels were coated with the described carboxyl-containing polymers; the coatings were dried and the coated panels were wired to baffles in a 3 liter polymerization reactor. The reactor was equipped with heating and cooling means, stirring means and baffles attached to the walls of the reactor. The following polymerization recipe and stated procedure were used in all of the Examples of this Specification:

The polymerization recipe was: 1000 grams of vinyl chloride, 2055 grams of demineralized water, 0.5 gram of 88% hydrolyzed polyvinyl acetate (Vinol 540) and 0.5 ml of di-secondary butyl peroxydicarbonate. The reactor was completely filled, and water was added to keep the reactor full. The polymerizations were conducted at 57° C. After addition of 400 grams of water, 80% of the vinyl chloride having been converted to poly(vinyl chloride), the reaction was stopped by cooling and the contents of the reactor were removed. After removal of the polymer mixture, the internal surfaces of the reactor were rinsed with water and the panels removed for inspection.

There are two general types of polymer build-up on reactor surfaces exposed to polymerization mixtures, a papery coating and at a later stage, sandy or grainy feeling and appearing surfaces that are rather hard. Both types are not always observed. The amounts of these deposited materials observed is compared to and based on paper and sandy build-up on a stainless steel surface in a standard polymerization process in the absence of surface coatings. An arbitrary value of 1.5 is assigned to that build-up condition normally observed in the absence of coating materials used to reduce wall build-up. A rating of 0.0 is perfect, representing no build-up at all on the stainless steel surfaces. Values below 1.0 are considered values representing substantial improvement in decreased polymer build-up. Therefore, in testing coating materials to determine whether they provide reduced polymer build-up on reactor surfaces, those materials that result in values of one or more are not considered useful for the purpose, while those materials resulting in values less than one, preferably less than 0.5, represent definite and useful improvement in decrease in polymer build-up. Both paper and sand type deposit values are assigned.

EXAMPLE 1

To demonstrate the practice of the invention, polyacrylic acid, having a weight average molecular weight of 400,000 (gel permeation chromatography) was reacted with varying amounts of trimethyl ortho acetate to esterify part of the carboxyl groups to ethyl groups (equivalent to copolymerized ethyl acrylate-EA). The procedure followed was to dissolve 4 grams of polyacrylic acid in 25 ml of dimethylformamide at 110° C. for 24 hours with the following amounts of trimethylorthoacetate to provide copolymers containing 100, 50, 35, 25, and 15 weight percent acrylic acid groups and 0, 50, 65, 75 and 85 weight percent ester groups. The amounts of acetate used were 0.0, 1.5 ml, 3.0 ml, 4.5 ml, and 6.0 ml. The polymers were then dried. 5 percent solutions in methanol of the polymers so prepared were coated on the ferrotype panels, and the coatings dried. The coatings were about one micron thick. The panels were wired to the reactor baffles and the standard polymerization tests for polymer buildup on the test panels were run. The polymers tested and the results obtained are set forth in Table 1.

TABLE 1

| Coating Composition | Build-up Rating Paper/Sand |
|---|---|
| 100% AA[1] | 1.0/0.1 |
| 50% AA/50% EA | 0.0/0.0 |
| 35% AA/65% EA | 0.1/0.0 |
| 25% AA/75% EA | 1.2/0.0 |
| 15% AA/85% EA | 1.5/1.0 |

[1]Weight Percent - acrylic acid

Excellent results were obtained with the 50 weight percent acrylic acid copolymer and the 35 weight percent acrylic acid copolymer. With the 50 weight percent acrylic acid copolymer, the reactor was perfectly clean, and almost so with the 35 weight percent acrylic acid copolymer. Poor results were obtained with the copolymer containing 25 weight percent acrylic acid, the 15 weight percent acrylic acid and with the polyacrylic acid (100 weight percent acrylic acid), demonstrating the criticality of the carboxyl content of the copolymers of monocarboxylic acids. Polymerization reactions run in the presence of panels coated with 50% AA/50%EA deposited from (1) a water solution, and (2) a dimethyl formamide solution resulted in no polymer build-up on the panels, a 0.0/0.0 rating. When this Example was repeated with a commercial copolymer containing 10.8 mol percent acrylic acid and 89.2 mol percent acrylate ester comonomers, a rating of 1.5/1.5 was observed.

EXAMPLE 2

Copolymers of 50 mole percent maleic anhydride and 50 mole percent methyl vinyl ether, having different molecular weights, were hydrolyzed with water or alcohols. A 5 percent solution in water or an alcohol was prepared and aged for 48 hours at room temperature to obtain the desired hydrolyzed product. The samples hydrolyzed with water contained 100 mole percent carboxyl groups, while those hydrolyzed with alcohols contained 50 mole percent carboxyl groups. The resulting solutions were coated on ferrotype panels to a thickness of 0.6 micron, and dried. The dried coated plates were wired to baffles in the test reactor and three successive polymerization reactions were run as described above. The panel ratings are set forth in Table 2.

TABLE 2

| Polymer Specific Viscosity $\eta sp$ | Polymer Form Used | Solvent Used | Build-up Rating |
|---|---|---|---|
| 2.6–3.5 | 100 mole percent carboxyl groups | water | 0.0/0.0 |
| 2.6–3.5 | ½ methyl ester | methanol | 0.1/0.0 |
| 2.6–3.5 | ½ isopropyl ester | isopropanol | 0.2/0.0 |

TABLE 2-continued

| Polymer Specific Viscosity ηsp | Polymer Form Used | Solvent Used | Build-up Rating |
|---|---|---|---|
| 2.6–3.5 | ½ butyl ester | butanol | 0.0/0.0 1.0/0.0 |
| 2.6–3.5 | ½ octyl ester | octanol | 2.0/2.0 |
| 1.5–2.0 | 100 mole percent carboxyl groups | water | 0.0/0.0 |
| 0.1–0.5 | 100 mole percent carboxyl groups | water | 0.0/0.0 |

Specific viscosity values of about 0.1 to 3 represent GPC weight average molecular weights of about 10,000 to 800,000. When the anhydride function is hydrolyzed with water, two carboxyl groups per anhydride are provided. When maleic anhydride is hydrolyzed with alcohols, one carboxyl and one ester group are obtained per mole of anhydride, thus giving the "half esters" when alcohols are used. The higher the molecular weight of the ester group in the half ester, normally the poorer the results obtained. In other words, as the molecular weight (carbon atoms) of the ester group is increased, the build-up on reactor surfaces increases to an extent that the octyl half ester is of no value as a reactor coating per se.

EXAMPLE 3

A 5 percent solution of 50 mole percent maleic anhydride/50 mole percent methyl vinyl ether copolymers in water was allowed to age at room temperature for 48 hours to hydrolyze the anhydride group to carboxyl groups. This solution was added to a polymerization reactor to coat all of the exposed surfaces with the solution. The solution was removed and the coating dried at 50° C. The coating was about one micron thick. Polymerizations were run following the recipe and procedure given above. Excellent results were obtained after three successive polymerizations run in the same equipment. After one polymerization cycle the reactor surface rating was 0.0/0.0; after the second cycle, 0.0/0.3; and after the third cycle, 0.2/0.5, all ratings being excellent and showing the value of these polymers in decreasing the amount of polymer build-up on reactor surfaces even after successive polymerization reactions.

To demonstrate the utility of these novel reactor surface coatings in larger scale polymerizations, panels attached to the walls of a 4300 gallon reactor were coated with about a one micron layer of the hydrolyzed maleic anhydride/methyl vinyl ether copolymer used in Example 3 (100 mole percent carboxyl groups) and dried. After two cycles of polymerization of vinyl chloride charges, the rating of the panels for polymer build-up was 0.0/0.0. In reactions where the panels were uncoated, the values were 1.5/1.0 build-up. When the exposed reactor surfaces of the 4300 gallon polymerization reactor are coated with this carboxyl-containing polymer with 35 ounces of a 2.5% water solution of the polymer, sprayed on the exposed surfaces and dried, this results in about a 0.6 micron film of polymer. This represents only 25 grams of polymer per 4300 gallon charge, or 4 ppm, showing the effectiveness of only minute amounts of the defined carboxyl-containing copolymers on the critical exposed surfaces.

I claim:

1. A polymerization reaction vessel having the internal surfaces thereof that are exposed to an aqueous polymerization reaction mixture of vinylidene monomers coated with a dried anionic, water-soluble carboxyl-containing copolymer selected from the group consisting of (1) copolymers containing about 30 to about 80 mole percent of residues equivalent to olefinically unsaturated monocarboxylic acids and about 70 to about 30 mole percent of residues equivalent to at least one copolymerizable vinylidene comonomer having at least one terminal >$CH_2$ group, and (2) copolymers containing about 50 mole percent of residues equivalent to olefinically unsaturated dicarboxylic acids and about 50 mole percent of residues equivalent to at least one copolymerizable vinylidene comonomer having at least one terminal <$CH_2$ group, said coating being at least about 0.1 micron in thickness.

2. A polymerization reaction vessel of claim 1 wherein said copolymer contains about 35 to about 65 mole percent acrylic acid and about 65 to about 35 mole percent of at least one copolymerizable vinylidene comonomer containing one terminal $CH_2=C<$ group, and having a molecular weight of about 3,000 to about 1,000,000.

3. A polymerization reaction vessel of claim 2 wherein, in the copolymer, the copolymerizable vinylidene comonomer is an alkyl acrylate wherein the alkyl groups contain 1 to 4 carbon atoms.

4. A polymerization reaction vessel of claim 3 wherein the alkyl group is ethyl.

5. A polymerization reaction vessel of claim 1 wherein said copolymer contains about 50 mole percent maleic acid and about 50 mole percent of at least one copolymerizable monoolefinic vinylidene comonomer having one terminal $CH_2=C<$ group.

6. A polymerization reaction vessel of claim 5 wherein said vinylidene comonomer is an alkyl vinyl ether wherein the alkyl groups contain 1 to 4 carbon atoms.

7. A polymerization reaction vessel of claim 6 wherein the alkyl group is methyl.

8. A polymerization reaction vessel of claim 1 wherein said copolymer contains about 35 to about 65 mole percent methacrylic acid and about 65 to about 35 mole percent of at least one copolymerizable vinylidene comonomer containing one terminal $CH_2=C<$ group, and having a molecular weight of about 3,000 to about 1,000,000.

9. A method for reducing polymer build-up on the internal surfaces of a polymerization reaction vessel exposed to aqueous polymerization reaction mixtures of vinylidene monomers, comprising applying on said internal surfaces of the polymerization vessel exposed to contact with the polymerization reaction mixtures, prior to adding the polymerization reaction mixture to the polymerization vessel, a coating of material comprising anionic, water-soluble carboxyl-containing copolymers selected from the group consisting of (1) copolymers containing about 30 to about 80 mole percent of residues equivalent to olefinically unsaturated monocarboxylic acids and about 70 to about 30 mole percent of residues equivalent to at least one copolymerizable vinylidene comonomer having at least one terminal >$CH_2$ group, and (2) copolymers containing about 50 mole percent of residues equivalent to olefinically unsaturated dicarboxylic acids and about 50 mole percent of residues equivalent to at least one copolymerizable vinylidene comonomer having at least one terminal >$CH_2$ group, and drying said coating, said coating being at least about 0.1 micron in thickness.

10. A method of claim 9 wherein the polymerization reaction mixture is an aqueous mixture and said copolymer contains about 35 to about 65 mole percent acrylic acid and about 65 to about 35 mole percent of at least one copolymerizable vinylidene comonomer containing one terminal $CH_2=C<$ group, and having a molecular weight of about 3,000 to about 1,000,000.

11. A method of claim 10 wherein the polymerization reaction mixture is an aqueous mixture and in the copolymer, the copolymerizable vinylidene comonomer is an alkyl acrylate wherein the alkyl groups contain 1 to 4 carbon atoms.

12. A method of claim 10 wherein the polymerization reaction mixture is an aqueous mixture and said copolymer contains about 35 to about 65 mole percent methacrylic acid and about 65 to about 35 mole percent of at least one copolymerizable vinylidene comonomer containing one terminal $CH_2=C<$ group, and having a molecular weight of about 3,000 to about 1,000,000.

13. A method of claim 9 wherein the polymerization reaction mixture is an aqueous mixture and said copolymer contains about 50 mole percent maleic acid and about 50 mole percent of at least one copolymerizable monoolefinic vinylidene comonomer having one terminal $CH_2=C<$ group.

14. A method of claim 13 wherein said vinylidene comonomer is an alkyl vinyl ether wherein the alkyl group contains 1 to 4 carbon atoms.

15. A method for polymerizing vinyl chloride, optionally with other vinylidene comonomers copolymerizable therewith, in a polymerization vessel in an aqueous media, in the presence of a free radical forming catalyst, comprising, before adding the polymerization materials to the polymerization vessel, coating the internal surfaces of the polymerization vessel exposed to the polymerization materials during the polymerization reaction with a coating material comprising an anionic, water-soluble carboxyl-containing copolymer selected from the group consisting of (1) copolymers containing about 30 to about 80 mole percent of residues equivalent to olefinically unsaturated monocarboxylic acids and about 70 to about 30 mole percent of residues equivalent to at least one copolymerizable vinylidene comonomer having at least one terminal $>CH_2$ group, and (2) copolymers containing about 50 mole percent of residues equivalent to olefinically unsaturated dicarboxylic acids and about 50 mole percent of residues equivalent to at least one copolymerizable vinylidene comonomer having at least one terminal $>CH_2$ group, and drying said coating, said coating being at least about 0.1 micron in thickness.

16. A method of claim 15 wherein said copolymer contains about 35 to about 65 mole percent acrylic acid and about 65 to about 35 mole percent of at least one copolymerizable vinylidene comonomer containing one terminal $CH_2=C<$ group, and having a molecular weight of about 3,000 to about 20,000.

17. A method of claim 16 wherein, in the copolymer, the copolymerizable vinylidene comonomer is an alkyl acrylate wherein the alkyl groups contain 1 to 4 carbon atoms.

18. A method of claim 15 wherein said copolymer contains about 50 mole percent maleic acid and about 50 mole percent of at least one copolymerizable monoolefinic vinylidene comonomer having one terminal $CH_2=C<$ group.

19. A method of claim 18 wherein said vinylidene comonomer is an alkyl vinyl ether wherein the alkyl groups contain 1 to 4 carbon atoms.

20. A method of claim 15 wherein the polymerization is a suspension polymerization.

21. A method of claim 15 wherein the polymerization is an emulsion polymerization.

22. A method of claim 15 wherein the coating material is applied to the surfaces of the polymerization vessel from a solution and applied in amount to provide a coating of about 0.1 to about 5 micron thickness.

* * * * *